Patented Aug. 15, 1939

2,169,549

UNITED STATES PATENT OFFICE 2,169,549

PROPAGATION OF PLANTS

Percy W. Zimmerman and Albert E. Hitchcock, Yonkers, N. Y., assignors to Boyce Thompson Institute for Plant Research, Inc., Yonkers, N. Y., a corporation of New York No Drawing. Application March 17, 1937, Serial No. 131,371

10 Claims. (Cl. 47—58)

This invention relates to the propagation of plants from cuttings, and has for its object the provision of an improved method for inducing root-growth on such cuttings. This application is a continuation in part of our copending application Serial No. 72,058, filed April 1, 1936.

It has heretofore been recognized that certain gases (e. g., ethylene) induce definite types of formative responses on plants, such as stimulation or retardation of the growth of certain tissues, and the initiation of cell division which results in various kinds of proliferations or in the formation of roots. As a result of an exhaustive investigation of the effects of various types of growth substances on plants, we have discovered that certain organic compounds exercise a pronounced stimulating effect on root-growth, and are highly valuable in promoting and inducing root-growth on plant slips or cuttings. In this specification and in the appended claims, the word "cutting" and the expression "cuttings and the like" are used generically to designate any part of a plant, including buds, scions, and slips, used for purposes of propagation, and the invention advantageously may be employed to promote plant propagation from any such plant part by inducing active callus formation, root-growth, and similar plant physiological responses.

Among the organic compounds which we find useful for inducing root-growth are phenylacetic acid and its derivatives. In the appended claims these compounds are defined generically as compounds in which the phenyl radical is substituted for one of the hydrogen atoms attached to the terminal carbon atom farthest from the carboxyl group of a compound having the acetic acid structure as its nucleus, that is, the acetic acid structure (which does not include the acid hydrogen atom of acetic acid itself) is the base or foundation of the molecule of the compound.

Based on the foregoing discovery, our present invention involves the improvement in propagating plants from cuttings which comprises the step of inducing root-growth by subjecting the cutting to the action of a substance of the group consisting of phenylacetic acid and its derivatives. Only a minute amount of the substance is necessary to induce vigorous root-growth and high concentrations are usually injurious rather than beneficial.

Phenylacetic acid itself is an especially satisfactory substance for use in the practice of our invention, but derivatives of phenylacetic acid in general may be employed with success. Among the derivatives of phenylacetic acid which we have found of special advantage in the practice of the invention are salts of phenylacetic acid and esters of phenylacetic acid. The alkali metal salts (including the ammonium salt) and the alkali-earth metal salts of phenylacetic acid in general are the preferred salts for use in carrying out the invention. The lower alcohol esters (such as the methyl and ethyl esters) of phenylacetic acid constitute the preferred esters for use in carrying out the invention. So far as we have now determined, however, all of the salts and esters of phenylacetic acid possess definite powers of inducing root-growth and similar plant physiological responses on cuttings and the like.

Treatment of the more succulent type of plants, such as the tomato, African marigold, tobacco, etc., with the growth substances of the present invention (i. e., phenylacetic acid and its derivatives) has shown that roots may be induced to grow from any portion of the stem, and even from the leaves of many species. The growth substance may be mixed with lanolin, olive oil, paraffin oil, maize oil, castor oil, "Amalie" oil (a commercial mineral oil) and the like, and a thin film of the mixture may be applied by rubbing with a glass rod on the epidermis of the region to be treated. The usual concentrations found most effective are from about 0.01 to 2% of the growth substance on the weight of lanolin or the like. Lanolin and similar preparations of the growth substance may be applied directly to the cutting, or they may be placed on shoots which remain attached to the parent plant during the period of treatment and are then removed and made into cuttings that are handled at this stage the same as is normally done in commercial practice. When applied to the stems, the growth substances of the present invention definitely cause local initiation of roots on growing plants of tomato, sun flower, marigold, artichoke, buckwheat, dahlia, and tobacco. If the plants are kept in a glass case after treatment, the new roots force their way through the epidermis and out into the humid atmosphere. The time required for roots to make their appearance varies with the growth substance used, the concentration, the species of plants, and the exact place on the plant where the material is applied.

Phenylacetic acid itself is especially effective for initiating roots on both stems and leaves.

In the case of phenylacetic acid itself, a 0.01 to 2.0% solution in lanolin causes negative (away from side where substance was applied) bending of tomato stems. Positive (toward side where substance is applied) bending occurs when the concentration of the substance is high enough to injure the tissue or retard the normal rate of growth. A 0.1 to 2.0% solution of phenylacetic acid in general is optimum for inducing adventitious roots.

In general, it might be stated that the most effective concentration for root initiation falls just below that causing positive bending of the stem, or at the point where there is slight retardation of growth. When the concentration is high enough to cause evident injury, roots appear on the opposite side or adjoining the place on the stem where the substance is applied. This result indicates that as the growth substance diffuses away from the point of toxic concentration a range is reached which is effective for inducing roots. Under favorable conditions, 15 to 40 mg. of phenylacetic acid per gram of lanolin causes roots to be induced and appear through the epidermis on tomato in six days, marigold in five days, tobacco in eight days, and artichoke in six days. Five milligrams of phenylacetic acid per gram of lanolin are effective, but usually require about two days more to induce roots.

In commercial practice, treatment of the cutting or parent plant with a water solution of the growth substance is generally more satisfactory and applicable than treatment with lanolin (and similar) preparations. Thus, the growth substance may be dissolved in the water (in which it is only sparingly soluble), and the basal end of the plant cutting placed in the solution. The basal end of the cutting immersed in such a solution for from several hours to several days induces subsequent growth of excellent root systems. The concentration of the growth substance in the aqueous solution is relatively minute, say a few milligrams per 100 cc. of water. Thus, solutions containing 5 to 40 mg. of phenylacetic acid per 100 cc. of water give satisfactory results for many species.

In practicing the invention with water solutions of the growth substances, the plant cutting is placed in the solution for a period of time ranging from a few hours to several days. The cutting, after treatment in the solution, may be planted in a mixture of half sand and half peat moss, for example, or in soil. The effectiveness of the treatment is indicated in many ways, such as the increased percentage of rooted cuttings, increase in size of the root systems, earlier appearance of roots, greater total number of roots, and the emergence of roots from stem tissue above the base of the cutting as well as at the base.

Cuttings of American holly (*Ilex opaca*) placed in solutions of phenylacetic acid (4 to 16 mg. per 100 cc.) for periods ranging from eight hours to two days produced excellent root systems six to ten weeks after treatment and planting. These results are of special significance since cuttings of American holly are difficult to root. A similar favorable response to treatment with water solutions of phenylacetic acid was obtained with Japanese maple at the end of six to ten weeks, Japanese holly (*Ilex crenata*) at the end of about four weeks, Taxus at the end of eight to ten weeks, American elm at the end of four to six weeks, and with many other genera and species at the end of periods ranging from two to ten weeks.

The derivatives of phenylacetic acid referred to herein as growth substances of the invention are those compounds in which an atom other than a hydrogen atom or a radical has been substituted for the acid hydrogen atom of the phenylacetic acid.

We claim:

1. The improvement in propagating plants from cuttings and the like which comprises the step of inducing root-growth by subjecting the cutting to the action of a compound in which the phenyl radical is substituted for one of the hydrogen atoms attached to the terminal carbon farthest from the carboxyl group of a compound having the acetic acid structure as its nucleus.

2. The improvement in propagating plants from cuttings and the like which comprises the step of inducing root-growth by subjecting the cutting to the action of phenylacetic acid.

3. The improvement in propagating plants from cuttings and the like which comprises the step of inducing root-growth by subjecting the cutting to the action of an alkali metal salt of phenylacetic acid.

4. The improvement in propagating plants from cuttings and the like which comprises the step of inducing root-growth by subjecting the cutting to the action of a lower alcohol ester of phenylacetic acid.

5. The improvement in propagating plants from cuttings and the like which comprises the step of inducing root-growth by subjecting the basal end of the cutting to the action of a substance of the group consisting of phenylacetic acid, salts of phenylacetic acid, and esters of phenylacetic acid.

6. The improvement in propagating plants from cuttings and the like which comprises the step of inducing root-growth by subjecting the basal end of the cutting to the action of phenylacetic acid.

7. The improvement in propagating plants from cuttings and the like which comprises the step of inducing root-growth by subjecting the basal end of the cutting to the action of an alkali metal salt of phenylacetic acid.

8. The improvement in propagating plants from cuttings and the like which comprises the step of inducing root-growth by subjecting the basal end of the cutting to the action of a lower alcohol ester of phenylacetic acid.

9. The improvement in propagating plants from cuttings and the like which comprises the step of inducing root-growth by immersion treatment of the basal end of the cutting in an aqueous solution containing phenylacetic acid.

10. The improvement in propagating plants from cuttings and the like which comprises the step of inducing root-growth by immersion treatment of the basal end of the cutting in an aqueous solution containing an alkali metal salt of phenylacetic acid.

PERCY W. ZIMMERMAN.
ALBERT E. HITCHCOCK.